United States Patent Office 3,541,076
Patented Nov. 17, 1970

---

3,541,076
BASIC MONOAZO-DYESTUFFS CONTAINING A 3-INDOLYL- OR 5-AMINO-4-PYRAZOLYL GROUP
Eberhard Mundlos, Frankfurt am Main, and Reinhard Mohr, Johann Ostermeier, Bernhard Spiess, and Kurt Hohmann, Offenbach am Main, Germany, assignors to Farbwerke Hoechst Aktiengesellschaft vormals Meister Lucius & Bruning, Frankfurt am Main, Germany, a corporation of Germany
No Drawing. Filed June 27, 1967, Ser. No. 649,112
Claims priority, application Germany, July 9, 1966, F 49,658
Int. Cl. C09b, 29/36, 29/38, 45/00
U.S. Cl. 260—146          11 Claims

ABSTRACT OF THE DISCLOSURE

Basic azo-dyestuffs free from sulfonic acid and carboxylci acid groups having general formula

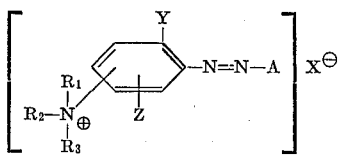

in which $R_1$, $R_2$ and $R_3$ each represents a lower alkyl group which may be substituted, Y and Z each represents a hydrogen atom or a non-ionogenic substituent, A represents a 3-indolyl- or 5-amino-4-pyrazolyl radical and $X^-$ represents an anion, and a process for their manufacture, said dyestuffs being relatively insensible to pH variations and stable to high temperatures and having good fastness properties, high tinctorial strength and clear dyeings and particularly useful on polyacrylonitrile or polyvinylidene cyanide fibers.

---

The present invention relates to basic azo-dyestuffs and to a process for their manufacture; it relates especially to basic azo-dyestuffs which are free from carboxylic acid groups and sulfonic acid groups and having the general formula

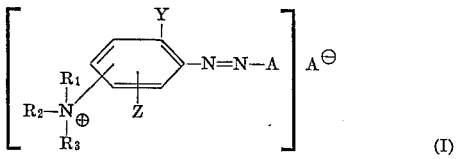

wherein $R_1$, $R_2$ and $R_3$ represent lower alkyl groups which may be substituted, Y and Z represent hydrogen or a non-ionogenic substituent, A represents a 3-indolyl- or 5-amino-4-pyrazolyl radical and X represents an anion.

Thus the new dyestuffs correspond to the general Formulae Ia and Ib

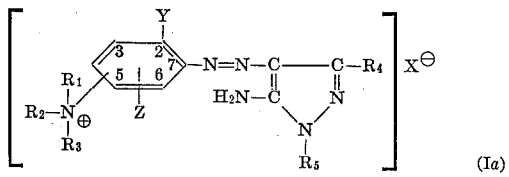

and

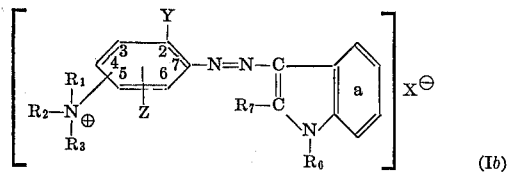

wherein $R_1$, $R_2$, $R_3$, Y, Z and X have the meaning given above, and $R_4$, $R_5$, $R_6$ and $R_7$ represent hydrogen, lower alkyl groups or aryl radicals, which may contain, as well as the benzene radical a, non-ionogenic substituents.

The dyestuffs described above may be obtained by coupling the diazonium compound of a quaternary amine of the general Formula II

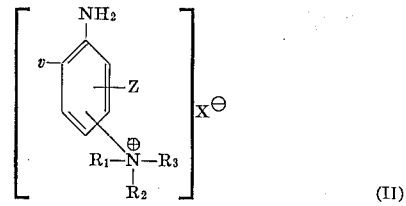

wherein $R_1$, $R_2$, $R_3$, Y and Z have the meaning given above, with indoles or 5-amino-pyrazoles.

The quaternary amines of Formula II used as starting compounds can be obtained by treating amines of Formula III

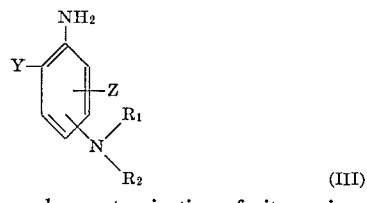

with alkylating agents or by quaternization of nitroamines of Formula IV

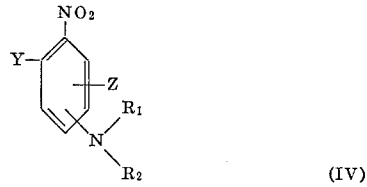

and then reducing the nitro group to the amino group according to usual methods, for example with the use of catalysts or by means of iron and hydrochloric acid.

Suitable components of Formula III or IV are o-, m- or p-amino-N,N-dialkylanilines or o-, m- or p-nitro-N,N-dialkylanilines at which Y and Z in the Formulae III and IV may represent hydrogen or a non-ionogenic substituent, for example, halogen atoms, such as fluorine, chlorine or bromine, alkyl groups, such as methyl, ethyl or propyl, alkoxy groups, such as methoxy, ethoxy or propoxy, trifluoromethyl or nitro groups, alkylsulfonyl groups, such as methyl-, ethyl- or propylsulfonyl, arylsulfonyl groups, such as phenylsulfonyl, aryl groups, such as phenyl, aryloxy groups, such as phenoxy or chlorophenoxy, acylamino groups, such as acetylamino, propionylamino, phenylacetylamino, formylamino or benzoylamino, acyl groups, such as acetyl, propionyl or benzoyl, cyano groups, carboxylic acid ester groups, such as carboxylic acid methyl-, ethyl-, propyl-, butyl- or phenylester, carboxylic acid amide or sulfonic acid amide groups which may be substituted, such as carboxylic acid dimethylamide, -diethylamide, -methyl-phenylamide or ethyl-phenylamide, sulfonic acid dimethylamide, -diethylamide, -dibutylamide, -methyl-phenylamide or -ethyl-phenylamide. Dyestuffs being especially valuable are obtained when using compounds of Formula III or IV in which Y represents a halogen atom, a trifluoromethyl, nitro, alkylsulfonyl, arylsulfonyl, carboxylic acid ester, cyano, a carboxylic acid amide or sulfonic acid amide group which groups may be substituted, or an acyl group, and in which Z represents a halogen atom, an alkyl, alkoxy, alkylsulfonyl, arylsulfonyl, sulfamyl, carbamyl, aryl, aryloxy, acylamino, carbalkoxy, trifluoromethyl, cyano or acyl group.

As quaternizing agents there may be mentioned alkyl halides, aralkyl halides, haloacetamides, β-halopropionitriles, halohydrines, alkyl esters of the sulfuric acid or alkyl esters of organic sulfonic acids. Appropriate quaternizing agents are for example methyl chloride, methyl bromide or methyl iodide, ethyl, bromide or ethyl iodide, propyl bromide or propyl iodide, benzyl chloride, dimethyl sulfate, diethyl sulfate, benzenesulfonic acid methyl ester, p-toluenesulfonic acid methyl-, ethyl-, propyl- or butyl ester. The quaternization is suitably carried out in an indifferent organic solvent, such for example in a hydrocarbon chlorohydrocarbon or nitrohydrocarbon, such as benzene, toluene, xylene, tetrachloroethane, chloroform, carbon tetrachloride, mono- or dichlorobenzene or nitrobenzene, in an acid amide or an acid anhydride, such as dimethylformamide, N-methyl-acetamide or acetic acid anhydride, in dimethylsulfoxide or in a ketone, such as acetone or methylethylketone. Instead of an organic solvent there may also be used an excess of the quaternizing agent. The quaternization is carried out at elevated temperatures, if desired or required under pressure. The conditions which are most favorable for each individual case can be easily determined by a preliminary test.

The diazotization of the amines of Formula II proceeds according to known methods, for example by means of hydrochloric acid and sodium nitrite. Diazonium compounds of the quaternary amines of Formula II, in which the trialkylammonium group is attached in para-position to the amino group, may furthermore be obtained by reacting p-chlorobenzene diazoniumtetrafluoroborates with trialkylamines in acetonitrile (cf. Houben-Weyl, Methoden der organischen Chemie, vol. X/3, p. 110 (1965).

The coupling with the coupling components is carried out in already known manner, for example in a neutral or acid medium, if desired or required, in the presence of buffer substances or agents which accelerate the coupling, such as pyridine.

Coupling components to be used in the process of the present invention are: 5-amino-pyrazoles, for example 5-amino-pyrazole, 5-amino-1-aryl - 3 - alkyl-pyrazoles, 5-amino-1,3-diaryl-pyrazoles, 5-amino-1,3-dialkyl-pyrazoles, 5-amino-3-alkyl-pyrazoles, 5-amino-1-alkyl - 2 - aryl-pyrazoles, 5-amino-1-cycloalkyl-3-alkyl-pyrazoles, 5-amino-1-arylpyrazoles or 5-amino-1-alkyl-pyrazoles, and indoles for example indole, 2-alkyl-indoles, 2-aryl-indoles, 1,2-dialkyl-indoles, 1-alkyl-2-aryl-indoles or 1-alkyl-indoles and the derivatives thereof which are substituted in the benzene nucleus. The alkyl or aryl radicals may still contain nonionogenic substituents.

Dyestuffs of Formula Ib may also be obtained in a modification of the process of the present invention by treating an azo-dyestuff of the general Formula V

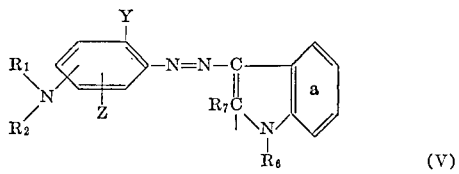

wherein $R_1$, $R_2$, $R_6$, $R_7$, Y and Z have the meaning defined above, with quaternizing agents.

The azo-dyestuff of Formula V used for this way of proceeding can be prepared according to known methods.

The dyestuffs obtainable according to the process of the present invention contain as anion X preferably the radical of a strong acid, such for example of the sulfuric acid or of a semi-ester thereof, of an arylsulfonic acid or of a hydrohalic acid. These anions which are used for the process of the present invention may also be replaced by anions of other acids, such for example as of the phosphoric acid, acetic acid, oxalic acid, lactic acid or tartaric acid. The dyestuffs may furthermore be isolated in form of their complex salts with zinc halides or cadmium halides or as tetrafluoroborates.

The new dyestuffs are appropriate for the dyeing or printing of tannin-treated cellulose fibers, silk, leather or fully synthetic fibers such as acetate rayon, polyamide fibers or acid modified polyester fibers, especially, however, fibers which contain polyacrylonitrile or polyvinylidene cyanide. In the majority of cases the dyeings produced on these fibers are very clear, have a high tinctorial strength and prove in general good fastness to light and wet processing. In general, the dyestuffs are largely insensible to variations of the pH value of the dyebath and may therefore be used in weakly acid as well as in strong acid baths. Moreover, they prove to be stable at temperature above 100° C. which are usual in the high temperature dyeing. Under normal dyeing conditions wool is completely resisted by the dyestuffs.

Compared with the monoazo-dyestuffs prepared by coupling of diazotized m- or p-amino-phenyltrialkyl ammonium bases and aromatic amines, known from German patent specifications Nos. 87,257, 87,584, and 1,005,486, the azodyestuffs obtainable according to the present invention are largely insensible to variations of the pH value of the dyebath and are superior as to fastness to fulling, to cross-dyeing and to carbonizing of the polyacryl nitrile dyeings produced with these dyestuffs.

The following examples serve to illustrate the invention but they are not intended to limit it thereto, the parts being by weight unless otherwise stated.

EXAMPLE 1

8.5 parts of 5-chloro-4-nitro-2-methylphenyl-trimethyl-ammonium-methylsulfate were added at 90–95° C. to a mixture of 50 parts by volume of water, 5 parts of iron powder and 0.25 part by volume of glacial acetic acid, and the batch was boiled under reflux for one hour. Then the pH-value was adjusted to 7 by means of 10 parts by volume of a 2 N sodium carbonate solution and the reaction mixture was filtered while hot. The filtrate was acidified with 22.5 parts by volume of 5 N hydrochloric acid, cooled to 0–5° C. and mixed with 5 parts by volume of 5 N sodium nitrite solution. Stirring was continued for 30 minutes, an excess of nitrite was destroyed by means of amidosulfonic acid and the diazo solution was clarified with kieselguhr. The diazo solution thus obtained was then poured within 30 minutes and at 20–25° C. into a solution of 4.3 parts of 1-phenyl-3-methyl-5-amino-pyrazole in 75 parts by volume of water and 10 parts by volume of 5 N hydro-chloric acid. The coupling mixture was then stirred for 2 hours at room temperature and 5 parts by volume of a zinc chloride solution of 70% strength were added. The zinc chloride complex salt of the dyestuff cation of the formula

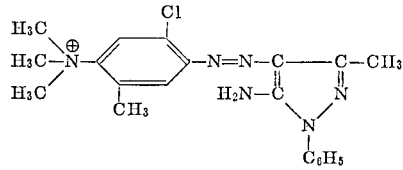

was filtered off, washed with a sodium chloride solution of 10% strength and dried. 11 parts of a yellow dyestuff were obtained.

For the preparation of dyeings 1 g. of the dyestuff was stirred to a paste with 2.5 g. of acetic acid of 50% strength and dissolved in 6 l. of water. 1 g. of sodium acetate and 10 g. of sodium sulfate were added to the dyebath. Then, 100 g. of pre-washed yarn of polyacrylonitrile staple fiber were introduced into the dyebath at 60° C., the temperature was slowly risen up to 100° C. and the yarn was dyed for 1 hour at boiling temperature. Subsequently the bath was allowed to cool slowly to about 70° C., the dyeing was rinsed and dried. A clear greenish yellow dyeing was obtained, having very good fastness to light and wet processing.

When using in the above given example instead of 4.3 parts of 1-phenyl-3-methyl-5-amino-pyrazole the corresponding amount of 1-(4'-methylphenyl) - 3-methyl-5-amino-pyrazole 1 - (3'-methoxyphenyl) - 3 - methyl-5-amino-pyrazole, 1 - (2'-chlorophenyl) - 3 - methyl-5-amino-pyrazole or 1 - (4'-acetylaminophenyl) - 3 - methyl-5-amino-pyrazole, there are also obtained yellow dyestuffs of similarly good fastness properties.

EXAMPLE 2

8.2 parts of 4-chloro-3-nitrophenyl-trimethyl-ammonium methylsulfate were reduced and diazotized as described in Example 1. The diazo solution obtained was added dropwise to a solution of 3.75 parts of 1,2-dimethyl-indole in 125 parts by volume of ethyl alcohol. The coupling mixture was stirred for 2 hours at room temperature and mixed with 5 parts by volume of a zinc chloride solution of 70% strength. The separated zinc chloride complex salt of the dyestuff cation of the formula

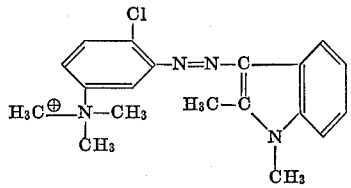

was filtered off with suction, washed with a sodium chloride solution and dried. 20 parts of a yellow dyestuff were obtained.

For the preparation of printings 20 g. of the dyestuff were dissolved by heating with 50 g. of β,β'-dihydroxydiethyl sulfide, 30 g. of cyclo-hexanol, 50 g. of acetic acid of 30% strength and 400 g. of water and the solution was stirred into 450 g. of a crystal gum thickener 1:2. With this printing paste a fabric of polyacrylonitrile staple fiber was printed. The print obtained was dried, steamed for 30 minutes at 0.5 atmospheric excess pressure, soaped at 50° C. in a bath containing 1 g. of a condensation product of oleic acid and methyl taurine per liter of water and finished as usual. A well fixed yellow print was obtained, having very good fastness to light and wet processing.

When using in the above given example instead of 3.75 parts of 1,2-dimethyl-indole the corresponding amount of 2,5-dimethyl-indole, 2 - methyl-5-ethoxy-indole, 2-methyl-5 - chloro - indole, 2-methyl-6-chloro-indole, 2-methyl-5-nitro-indole, 2 - methyl - 6 - cyano-indole, 2-methyl-5-bromo-indole, 2 - methyl - 5 - fluoro-indole, 2-methyl-5,7-dichloro-indole, 1 - methyl - 7 -ethyl-indole, 1,5-dimethyl-indole or 1-methyl-5-methoxy-indole, there are also obtained yellow dyestuffs of similar good fastness properties.

EXAMPLE 3

3 parts of 4-trimethylammonium - 2 - nitronaline-methosulfate were dissolved in 15 parts of hydrochloric acid, and diazotized at 5° C. with 9 parts of a 1 N sodium nitrite solution. The nitrite excess was destroyed by means of amido-sulfonic acid and a hydrochloric solution of 1.7 parts of 5-amino-1-phenyl-3-methyl pyrazole was added. Then 5 parts of sodium chloride were added and sodium acetate was dropped into the coupling mixture until pH value of 5 was obtained. The precipitate was filtered off with suction and dried. A yellow dyestuff of the formula

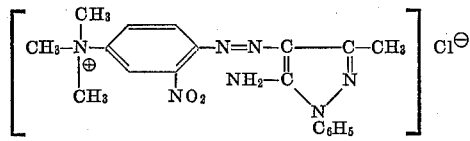

was obtained.

For the preparation of dyeings 4 g. of the dyestuff were mixed with 8 g. of sulfuric acid of 96% strength (diluted with water) and dissolved in 200 cc. of hot water. This stock solution was given into a yarn dyeing apparatus, in which were placed previously 20 l. of water, 40 g. of sodium sulfate and 2 g. of a reaction product of about 30 moles of ethylene oxide and 1 mole of nonyl phenol. Then 400 g. of yarn of polyacrylonitrile staple fiber were introduced at 50°, the bath was slowly heated and the material was dyed for 90 minutes at boiling temperature. After slowly cooling to about 70° C. the yarn was rinsed and dried. A clear golden yellow dyeing was obtained, having very good fastness to light and wet processing.

EXAMPLE 4

2 parts of 4 - trimethylammonium - 2 - trifluoromethyl-diazonium-fluoroborate (prepared by reacting 4-chloro-2-trifluoromethyl-benzene diazonium-tetrafluoroborate with trimethylamine in acetonitrile) were dissolved in a small amount of water and mixed with 1 part of 1,2-dimethyl-indole, dissolved in a small amount of alcohol. The yellow dyestuff which had precipitated and which corresponds to the formula

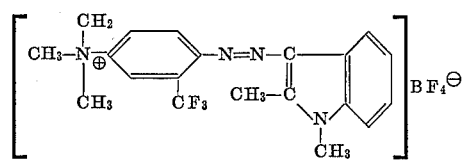

was filtered off with suction and dried.

5 g. of the dyestuff were mixed with 15 cc. of acetic acid of 50% strength and disolved with 300 cc. of hot water. The solution was added, while stirring, into a dyeing apparatus, in which 6 l. of water, 2 g. of a reaction product of about 30 moles ethylene oxide and 1 mole nonyl phenol and 3 g. of sodium acetate were previously placed. Then 500 g. of polyacrylonitrile yarn batched on a cross-wound bobbin were introduced into the apparatus, the temperature was slowly risen and the material was dyed for 45 minutes at 120° C. The dyebath was then cooled to about 70° C. and the dyeing was finished as usual. A clear greenish yellow dyeing was obtained, showing excellent fastness to light and to wet processing.

EXAMPLE 5

Within 20 minutes at 90 to 95° C. 8.2 parts of 4-chloro-3 - nitrophenyl - trimethylammonium-methyl-sulfate were given into a mixture of 37.5 parts by volume of water, 5 parts of ground dust obtained by needles and 0.5 part by volume of 5 N sulfuric acid. The batch was stirred for one hour at 95° C., then mixed with 0.8 part of calcinated sodium carbonate and filtered while hot. 7.5 parts by volume of 5 N sulfuric acid were added to the filtrate and the solution was cooled to 0° C. Within 15 minutes 5 parts by volume of a 5 N sodium nitrite solution were added and the reaction mixture was stirred for 30 minutes. After having destroyed an excess of nitrite by means of amidosulfonic acid the diazo solution was clarified with kieselguhr and charcoal. The diazo solution thus obtained was poured into a solution of 4 parts of 1-phenyl-5-amino-pyrazole in 50 parts by volume of water and 10 parts by volume of 5 N sulfuric acid. The coupling solution was stirred for 3 hours at room temperature and then mixed with 10 parts of sodium sulfate. The precipitated dyestuff of the formula

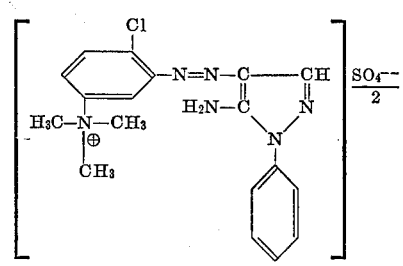

was filtered off with suction, washed with a sodium chloride solution and dried. 12 parts of a yellow brown dyestuff were obtained.

For the preparation of dyeings 1 g. of the dyestuff were mixed with 2 g. of acetic acid of 50% strentgh and dissolved in 5 l. of water containing 1 g. of sodium acetate. Then 10 g. of pre-washed material made of acid modified polyester fibers (Dacron 64) were given into the apparatus at a temperature of 60° C., the temperature was slowly risen and the material was dyed for 1 hour at 115° C. The dyebath was then cooled to about 70° C., the dyeing was rinsed and dried. A greenish yellow dyeing was obtained having good fastness to light and wet processing.

The following table shows further dyestuffs which can be obtained according to the present invention and the tints of dyeings on polyacrylonitrile fibers produced with these dyestuffs:

DYESTUFFS OF FORMULA Ia

Position of the $R_1$ | $R_2$—N—group | $R_3$

| $R_1$ | $R_2$ | $R_3$ | Position | Y | Z | $R_4$ | $R_5$ | X | Tint |
|---|---|---|---|---|---|---|---|---|---|
| methyl | methyl | methyl | 4 | chlorine | 6-chloro | methyl | phenyl | $BF_4$ | Yellow. |
| methyl | methyl | methyl | 4 | methoxy | hydrogen | methyl | phenyl | $BF_4$ | Greenish yellow. |
| methyl | methyl | methyl | 5 | chlorine | hydrogen | methyl | phenyl | Cl | Do. |
| methyl | methyl | methyl | 5 | methoxy | hydrogen | methyl | phenyl | $ZnCl_3$ | Yellow. |
| methyl | methyl | methyl | 5 | methyl | hydrogen | methyl | phenyl | $ZnCl_3$ | Greenish yellow. |
| methyl | methyl | methyl | 6 | hydrogen | hydrogen | methyl | phenyl | $ZnCl_3$ | Do. |
| methyl | methyl | methyl | 6 | hydrogen | 3-chloro | methyl | phenyl | $ZnCl_3$ | Do. |
| methyl | methyl | methyl | 5 | chlorine | 3-chloro | methyl | phenyl | $ZnCl_3$ | Do. |
| ethyl | ethyl | methyl | 5 | methyl | hydrogen | methyl | phenyl | $ZnCl_3$ | Do. |
| methyl | methyl | methyl | 5 | hydrogen | hydrogen | methyl | phenyl | $ZnCl_3$ | Do. |
| ethyl | ethyl | methyl | 5 | chlorine | hydrogen | phenyl | hydrogen | $ZnCl_3$ | Yellow. |
| ethyl | ethyl | methyl | 5 | methyl | hydrogen | phenyl | hydrogen | $ZnCl_3$ | Greenish yellow. |
| methyl | methyl | methyl | 5 | hydrogen | hydrogen | phenyl | hydrogen | $ZnCl_3$ | Do. |
| methyl | methyl | methyl | 5 | methyl | 3-chloro | methyl | phenyl | $ZnCl_3$ | Do. |
| methyl | methyl | methyl | 5 | chlorine | hydrogen | phenyl | hydrogen | $ZnCl_3$ | Reddish yellow |
| methyl | methyl | methyl | 5 | hydrogen | hydrogen | hydrogen | phenyl | $ZnCl_3$ | Greenish yellow. |
| ethyl | ethyl | methyl | 5 | methyl | hydrogen | hydrogen | phenyl | $ZnCl_3$ | Do. |
| ethyl | ethyl | methyl | 5 | chlorine | hydrogen | hydrogen | phenyl | $ZnCl_3$ | Do. |
| methyl | methyl | methyl | 5 | chlorine | hydrogen | methyl | ethyl | $ZnCl_3$ | Yellow. |
| methyl | methyl | methyl | 5 | chlorine | hydrogen | methyl | butyl | $ZnCl_3$ | Do. |
| methyl | methyl | methyl | 5 | chlorine | hydrogen | methyl | β-cyano-ethyl | $ZnCl_3$ | Do. |
| methyl | methyl | methyl | 5 | chlorine | hydrogen | methyl | methyl | $ZnCl_3$ | Do. |
| methyl | methyl | methyl | 5 | chlorine | hydrogen | methyl | β-hydroxy-ethyl | $ZnCl_3$ | Do. |
| methyl | methyl | methyl | 4 | chlorine | 5-methyl | methyl | phenyl | $ZnCl_3$ | Do. |
| methyl | methyl | methyl | 5 | chlorine | hyrdogen | hydrogen | phenyl | $ZnCl_3$ | Do. |
| methyl | methyl | methyl | 5 | chlorine | 5-chloro | hydrogen | phenyl | $ZnCl_3$ | Do. |
| methyl | methyl | methyl | 5 | sulfonic acid diethyl amide | hydrogen | hydrogen | phenyl | Cl | Greenish yellow. |
| methyl | methyl | methyl | 5 | methyl sulfonyl | hydrogen | hydrogen | phenyl | $ZnCl_3$ | Yellow. |
| methyl | methyl | methyl | 5 | sulfonic acid dimethyl amide | hydrogen | hydrogen | methyl | $ZnCl_3$ | Do. |
| methyl | methyl | methyl | 5 | sulfonic acid dimethyl amide | hydrogen | methyl | phenyl | $ZnCl_3$ | Do. |

DYESTUFFS OF FORMULA Ib

Position of the $R_1$ | $R_2$—N—group | $R_3$

| $R_1$ | $R_2$ | $R_3$ | Position | Y | Z | $R_6$ | $R_7$ | X | Tint |
|---|---|---|---|---|---|---|---|---|---|
| methyl | methyl | methyl | 4 | chlorine | 6-chloro | methyl | phenyl | $BF_4$ | Reddish yellow. |
| methyl | methyl | methyl | 4 | chlorine | 6-chloro | methyl | methyl | $BF_4$ | Do. |
| methyl | methyl | methyl | 4 | methoxy | hydrogen | methyl | methyl | $BF_4$ | Do. |
| methyl | methyl | methyl | 5 | methyl | hydrogen | methyl | methyl | $ZnCl_3$ | Do. |
| methyl | methyl | methyl | 5 | methoxy | hydrogen | methyl | methyl | $ZnCl_3$ | Do. |
| ethyl | ethyl | methyl | 5 | methyl | hydrogen | methyl | phenyl | $ZnCl_3$ | Do. |
| ethyl | ethyl | methyl | 5 | methyl | hydrogen | methyl | methyl | $ZnCl_3$ | Greenish yellow. |
| methyl | methyl | methyl | 5 | hydrogen | hydrogen | methyl | methyl | $ZnCl_3$ | Do. |
| methyl | methyl | methyl | 5 | chlorine | 3-chloro | methyl | methyl | Cl | Do. |
| methyl | methyl | methyl | 5 | chlorine | hydrogen | methyl | phenyl | Cl | Reddish yellow. |
| methyl | methyl | methyl | 5 | chlorine | 3-chloro | methyl | phenyl | Cl | Yellow. |
| ethyl | ethyl | methyl | 5 | methyl | hydrogen | hydrogen | methyl | $ZnCl_3$ | Do. |
| ethyl | ethyl | methyl | 5 | chlorine | hydrogen | hydrogen | methyl | $ZnCl_3$ | Reddish yellow. |
| ethyl | ethyl | methyl | 5 | methyl | hydrogen | hydrogen | hydrogen | $ZnCl_3$ | Yellow. |
| ethyl | ethyl | methyl | 5 | chlorine | hydrogen | hydrogen | hydrogen | $ZnCl_3$ | Yellow brown. |
| methyl | methyl | methyl | 5 | chlorine | hydrogen | hydrogen | methyl | $ZnCl_3$ | Yellow. |
| methyl | methyl | methyl | 5 | chlorine | hydrogen | hydrogen | hydrogen | $ZnCl_3$ | Yellow brown. |
| methyl | methyl | methyl | 5 | chlorine | 3-chloro | hydrogen | hydrogen | $ZnCl_3$ | Do. |
| methyl | methyl | methyl | 5 | chlorine | hydrogen | hydrogen | phenyl | $ZnCl_3$ | Yellow. |
| methyl | methyl | methyl | 5 | chlorine | hydrogen | ethyl | hydrogen | $ZnCl_3$ | Do. |
| methyl | methyl | methyl | 5 | chlorine | hydrogen | hydrogen | propyl | $ZnCl_3$ | Do. |
| methyl | methyl | methyl | 5 | sulfonic acid dimethyl amide | hydrogen | methyl | methyl | $ZnCl_3$ | Yellow. |
| methyl | methyl | methyl | 5 | sulfonic acid diethyl amide | hydrogen | methyl | methyl | $ZnCl_3$ | Golden yellow. |
| methyl | methyl | methyl | 5 | chlorine | hydrogen | phenyl | methyl | Cl | Yellow. |
| methyl | methyl | methyl | 5 | chlorine | 3-chloro | phenyl | methyl | Cl | Do. |
| methyl | methyl | methyl | 5 | chlorine | 3-chloro | hydrogen | methyl | $ZnCl_3$ | Do. |
| methyl | methyl | methyl | 4 | bromine | 6-bromo | methyl | methyl | $BF_4$ | Do. |
| methyl | methyl | methyl | 5 | ethyl | hydrogen | methyl | methyl | $ZnCl_3$ | Do. |
| methyl | methyl | methyl | 5 | ethoxy | hydrogen | methyl | methyl | $ZnCl_3$ | Do. |
| methyl | methyl | methyl | 5 | cyano | hydrogen | methyl | methyl | $ZnCl_3$ | Do. |
| methyl | methyl | methyl | 5 | carboxylic acid dimethyl amide | hydrogen | methyl | methyl | $ZnCl_3$ | Do. |

We claim:
1. A basic azo-dyestuff free from sulfonic acid and carboxylic acid groups having the formula:

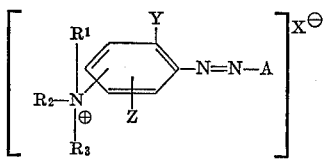

wherein $R_1$, $R_2$ and $R_3$ each represent lower alkyl, Y represents hydrogen, fluorine, bromine, chlorine, lower alkyl, lower alkoxy, trifluoromethyl, nitro, cyano, lower alkylsulfonyl, N,N-di-lower alkyl carboxamide or N,N-di-lower alkyl sulfonamide, Z represents hydrogen, fluorine, bromine, chlorine or lower alkyl, A stands for the radical of a coupling component having the formula:

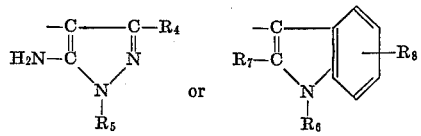

wherein $R_4$ represents hydrogen, lower alkyl or phenyl, $R_5$ represents hydrogen, lower alkyl, β-hydroxyethyl, β-cyanoethyl, phenyl, chlorophenyl, methylphenyl, methoxyphenyl or acetylamino-phenyl, $R_6$ represents hydrogen, lower alkyl or phenyl, $R_7$ represents hydrogen, lower alkyl or phenyl, $R_8$ represents hydrogen, fluorine, chlorine, bromine, lower alkyl, lower alkoxy, nitro or cyano and $X^{\ominus}$ stands for the anion of hydrochloric acid, sulfuric acid, zinc chloride or tetrafluoroborate.

2. The dyestuff according to claim 1 wherein $R_1$, $R_2$ and $R_3$ stand for methyl, Y stands for chlorine, N,N-dimethyl sulfonamide, trifluoromethyl or nitro, Z stands for hydrogen or methyl, $R_4$ stands for methyl or phenyl, $R_6$ stands for methyl, $R_7$ stands for methyl or phenyl and $R_8$ stands for hydrogen.

3. The basic azo-dyestuff having the formula

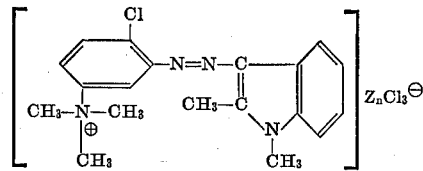

4. The basic azo-dyestuff having the formula

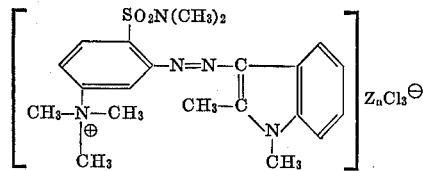

5. The basic azo-dyestuff having the formula

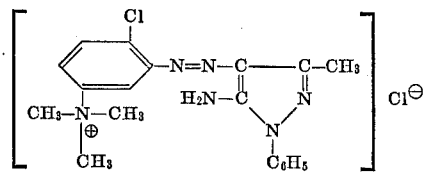

6. The basic azo-dyestuff having the formula

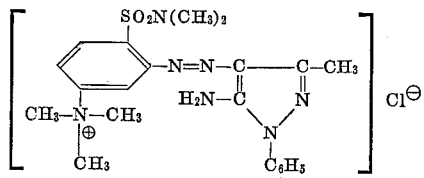

7. The basic azo-dyestuff having the formula

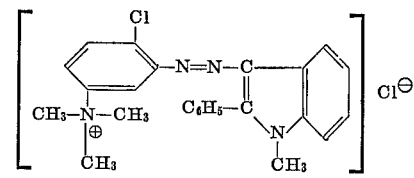

8. The basic azo-dyestuff having the formula

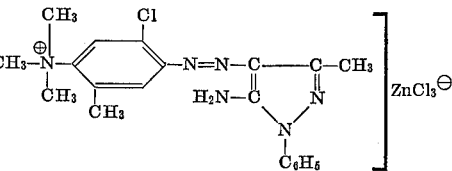

9. The basic azo-dyestuff having the formula

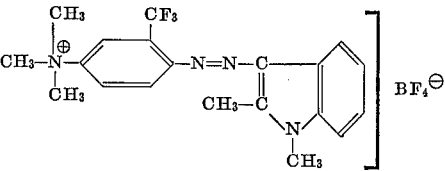

10. The basic azo-dyestuff having the formula

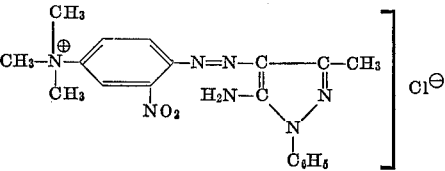

11. The basic azo-dyestuff having the formula

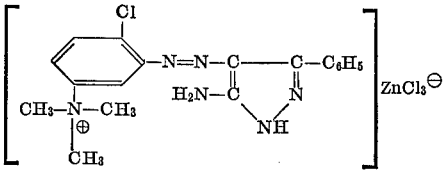

References Cited
UNITED STATES PATENTS 3,117,960   1/1964   Illy _____ 260—163 XR
3,336,285   8/1967   Towne et al. _____ 260—163 XR FLOYD D. HIGEL, Primary Examiner U.S. Cl. X.R.

8—13, 41, 42, 50; 260—147, 163, 165